Dec. 13, 1932.   V. G. APPLE   1,891,076
DYNAMO ELECTRIC MACHINE
Original Filed Jan. 5, 1928   3 Sheets-Sheet 1
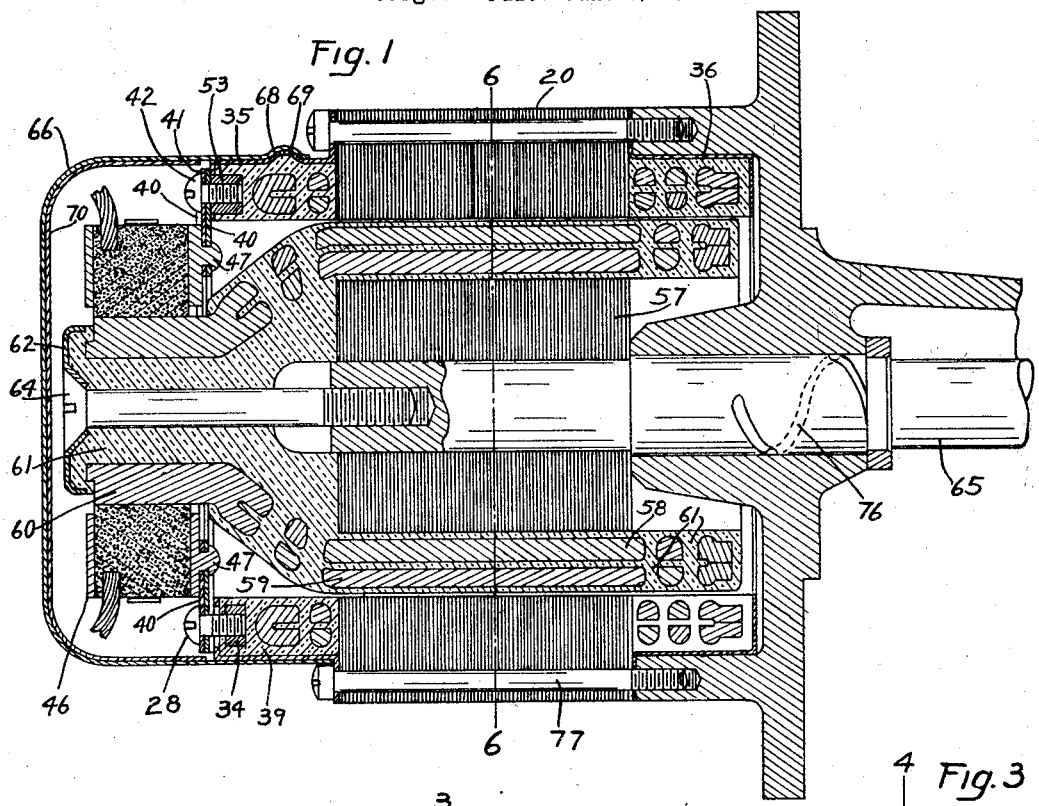
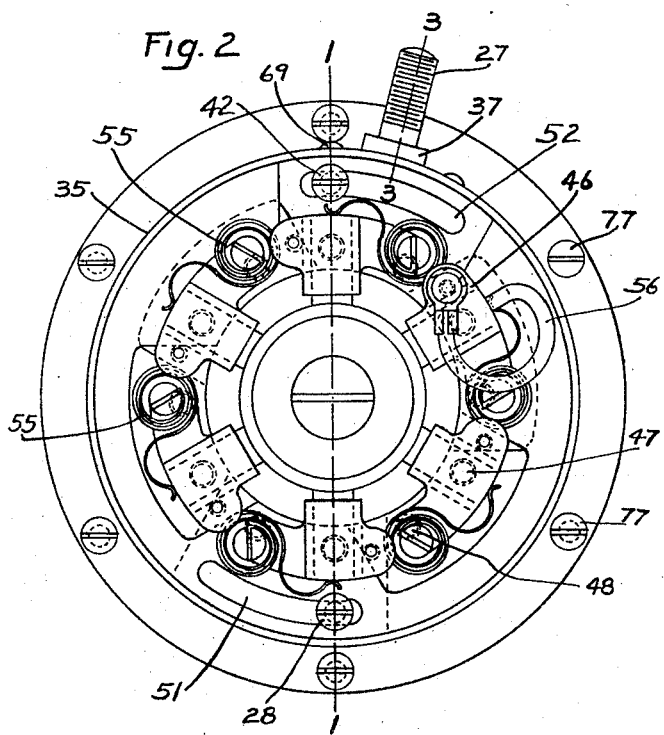
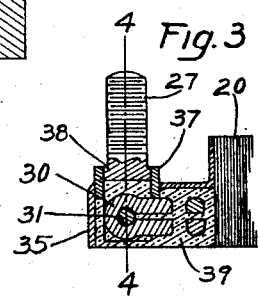
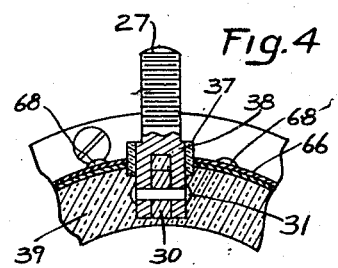
INVENTOR
Vincent G. Apple Dec. 13, 1932. V. G. APPLE 1,891,076
DYNAMO ELECTRIC MACHINE
Original Filed Jan. 5, 1928 3 Sheets-Sheet 2
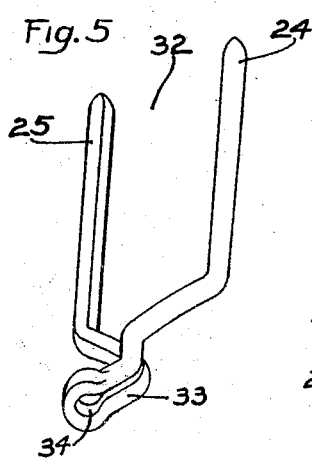
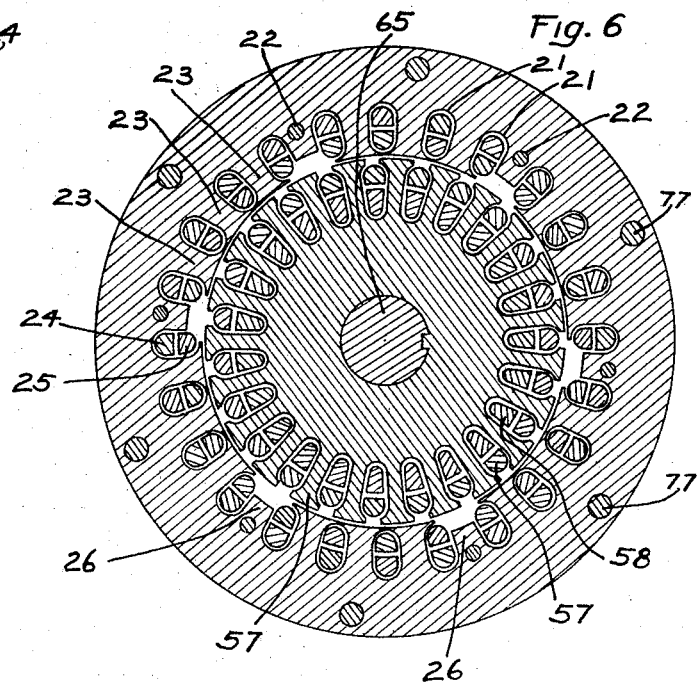
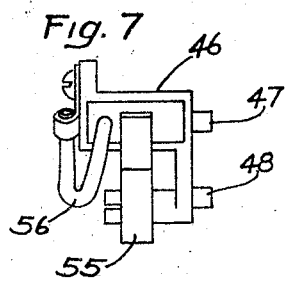
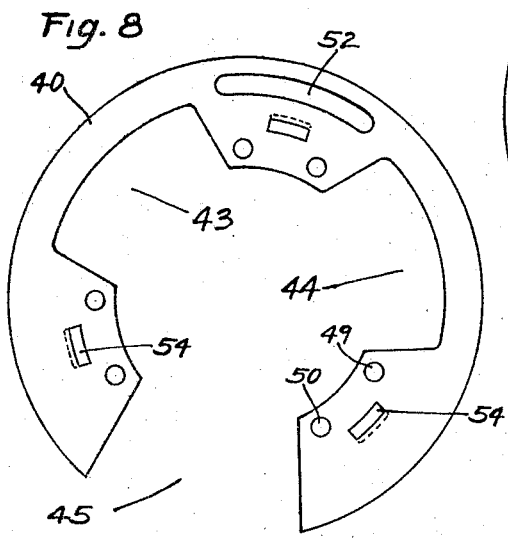
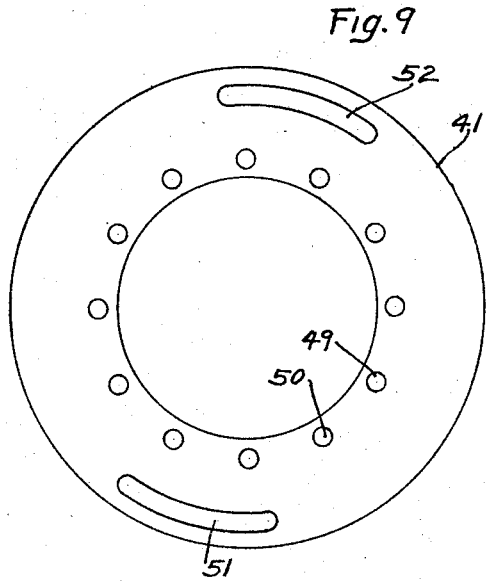
INVENTOR
Vincent G. Apple Dec. 13, 1932.   V. G. APPLE   1,891,076
DYNAMO ELECTRIC MACHINE
Original Filed Jan. 5, 1928   3 Sheets-Sheet 3

INVENTOR
Vincent G. Apple

Patented Dec. 13, 1932

1,891,076

UNITED STATES PATENT OFFICE

VINCENT G. APPLE, OF DAYTON, OHIO

DYNAMO ELECTRIC MACHINE

Original application filed January 5, 1928, Serial No. 244,735. Divided and this application filed May 1, 1929. Serial No. 359,706.

My invention is a division of my copending application Serial No. 244,735, filed January 5, 1928, and patented June 10, 1930, No. 1,763,549, and relates to dynamo electric machines comprising means for mounting them on other machines which they are to drive or by which they are to be driven.

One object of my invention is to construct a motor wherein no shaft bearing is required at the commutator end of the armature, thus insuring that no oil leaking from such bearing may impair the action of the commutator and brushes.

Another object is to so construct the motor that the field element thereof is a separate and distinct unit, having at one end means whereby it may align itself with the bearing carrying means, and at the other end means to align and support a brush rigging and a brush cover.

Another object is to so construct the field element of my motor that the brush rigging may be attached directly to the winding thereof, and not to loose wires or flexible leads extending therefrom as in ordinary practice.

Still another object is to provide a construction which, having no shaft bearing at the commutator end, permits of the removal of the entire front portion of the casing, thereby giving ready access to the brushes when renewal is necessary, or permitting inspection of the parts while the motor is running.

Further objects will be apparent to those skilled in the art from the following detailed description wherein reference is made to the drawings, in which—

Fig. 1 is a longitudinal vertical cross section through my motor as on the line 1—1 of Fig. 2.

Fig. 2 is a view of the motor from the commutator end, the brush cover having been removed.

Fig. 3 is a fragmentary cross section taken lengthwise of the motor through the binding post as on the line 3—3 of Fig. 2.

Fig. 4 is a fragmentary cross section taken at 4—4 Fig. 3.

Fig. 5 shows one of the turns of the field winding specially formed for making connection to the brushes.

Fig. 6 is a cross section taken on line 6—6 of Fig. 1.

Fig. 7 is a top view of one of the brush holders.

Fig. 8 is a detail view of one of the metal brush holder rings.

Fig. 9 is a detail view of the fibre brush holder ring.

Similar numerals refer to similar parts throughout the several views.

Figure 10:
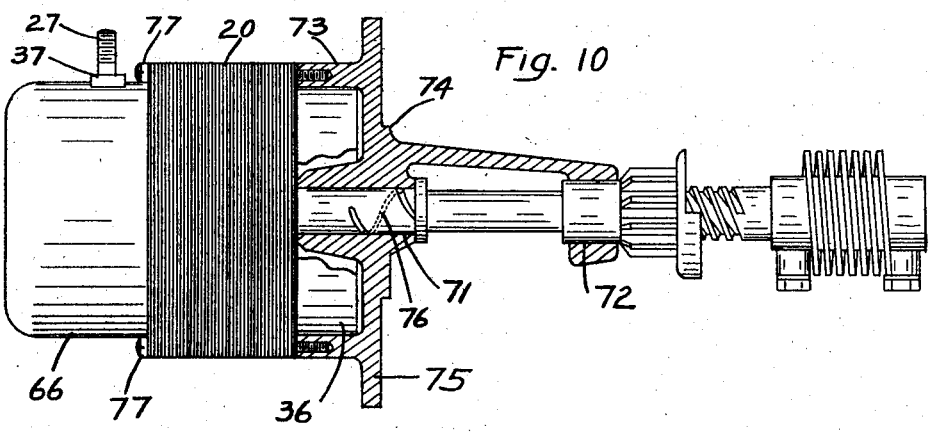
Figs. 10, 11 and 12 show several ways in which my dynamo electric machine may be applied as a starting motor for an internal combustion engine.

In the embodiment selected to illustrate my invention, the core or magnetic portion of the field element is in the form of a cylindrical ring composed of a plurality of laminæ 20, having apertures 21, 21, etc. spaced about the inner circumference (see Figs. 1 and 6). Rivets 22, 22, etc. may extend throughout the length of the core to hold the laminæ together until the winding is in place. In the embodiment shown the number of winding apertures in the field core is twenty-four, leaving twenty-four intervening portions or teeth extending inwardly towards the axis as at 23, 23, 23. A loop form distributed bar winding is used, each loop having a bar 24 forming a portion of the outer layer, and a bar 25, forming a portion of the inner layer, the span of the bars of the loops being such as to magnetically divide the ring into six poles, one north and the next south around the inner circumference, each pole comprising three flux carrying teeth 23, 23 and 23.

Teeth 26, 26, etc. separate the several poles and carry no flux, and, to lessen leakage from pole to pole, these teeth are shortened as shown. By forming loops having special end connecting portions the circuit through the field winding is divided into two equal parallel paths, the terminals of which are, at one end, the binding post 27, and, at the other end, the brush connecting screw 28.

One loop shown in Figs. 3 and 4, has the closed end formed into an eye 30, and a rivet 31 extending through this eye and the binding post 27 joins the two together, and another loop 32 shown in detail in Fig. 5 has the closed end bent at right angles as at 33 forming an eye 34 which is suitably tapped to receive screw 28. (See Figs. 1 and 2.)

After the winding is placed on the field core with the binding post joined to a loop as described, flanged covers 35 and 36 are placed over the end portions of the winding. A short piece of square tubing of insulating material 37 is pressed over a squared portion 38 of binding post 27 through a squared opening in cover 35. As the end openings in covers 35 and 36 may be of the same inside diameter as the field ring a cylindrical plug of this diameter may be inserted through the structure and fluid insulating material may be poured or pumped into the space left by the windings to extend therebetween and thereabout as at 39, and hardened or allowed to harden by heat or otherwise to form a solid mass, to thus more thoroughly insulate the windings and hold them in their relative position.

A mold or clamp placed over the flanges of covers 35 and 36 may be drawn up so as to compact the laminæ 20 to a predetermined core length while the insulating material within the end covers is being hardened, insuring that field units made by this process will be of uniformly accurate dimensions. When the insulating material is sufficiently hard the clamp and the cylindrical plug may be removed and the field unit will be complete.

A field element constructed as herein described has many advantages over one of the type now commonly used in automotive starting motors wherein a length of tubing is used as the yoke portion and poles are separately made and bolted to the inside of the tube.

The structure shown and described provides flux paths of least reluctance for a given diameter of field because of the large amount of magnetic material remaining when a sufficient amount has been removed for the windings, and because there are no joints in the magnetic circuit to increase the magnetic reluctance. The magnetic joints made when poles are bolted to a yoke are objectionable, not only because they require careful and accurate machining, but further because they add considerable reluctance to the magnetic circuit, which varies in similar motors or in different parts of the same motor according to the degree of accuracy attained.

A field winding of the character shown provides the shortest possible path for the electric current for a given number of turns thereby effecting economy in copper since the average length of a turn is shorter and the ineffective portions of the circuit have been reduced to a minimum. Since no two turns of the winding are immediately adjacent a better means is afforded to convey the heat from the conductors so that the motor may be operated at maximum effort for a greater period of time.

The spaced apart relation of the turns of the winding one with another permits of a considerable amount of insulating material being molded therebetween and thereabout thus providing a maximum of insulation between the turns, forming a rigid structure, and protecting the winding against the effect of oil and moisture as well as from physical injury.

The special field structure hereinbefore described, while particularly applicable to the present invention is not herein claimed, but is separately shown, described and claimed in my copending application Serial Number 202,138, filed June 28th, 1927, patented September 8, 1931, No. 1,822,261, wherein claims are made to the field element as such, the element therein claimed comprising the core, the bar winding and its terminals, the flanged covers of sheet metal, and the mass of insulation which holds the core, the bars and terminals and the flanged covers relatively positioned. Such a field element lends itself particularly to the structure claimed in the present application which essentially comprises a field element in combination with a bearing head supported at one end of the field element and a brush gear supported on the opposite end of the field element so as to be away from any and all bearings, together with convenient means for projecting the bearings into the interior of the engine where they are in close proximity to an ample supply of oil.

Brush rigging comprising a laminated ring of three layers, the two outer layers 40 and 40 being of sheet metal cut to the contour shown in Fig. 8, and the middle layer 41 of sheet insulating material cut to the contour shown in Fig. 9, is held in place by screws 28 and 42. Openings are cut in layers 40 at 43 and 44, and a portion 45 is entirely cut away. When the several layers of the ring are assembled, the cut away portion 45 of one ring is turned diametrically opposite this cut away portion of the other. Six brush holders 46 are required, each having tenons 47 and 48 extending therefrom. The laminated ring when assembled as described has six pairs of holes 49 and 50 through which tenons 47 and 48 may extend and be riveted, one brush holder riveting the middle ring to one outside ring, and the next brush holder riveting the middle ring to the other outside ring, and so on around.

It is readily apparent that when so assembled and riveted three equally spaced apart brush holders will be mounted on and electrically connected to one metal ring, while the other three spaced equally between the first three will be mounted on and electrically connected to the other metal ring, one set of three being electrically insulated from the other set of three. Slots 51 and 52 permit of the circumferential adjustment of the brush gear when screws 28 and 42 are loosened. Through contact of the head of screw 28 with the one outer layer 40 three brushes are connected to loop 32 which is one terminal of the field winding. Screw 42, being positioned at a cut away portion 45 of the outer layer 40, does not contact therewith but draws the inner layer 40 against the end of the field unit by extending into threaded hub 53, thus connecting the other three brushes to the cover 35 and thus to the ground.

Portions of the metal of the inner layer 40 of the brush ring may be depressed as at 54, 54, etc., to form a dowel which may extend into the field bore to maintain concentric relation between the brush rigging and the field element.

Brush springs 55, 55, etc. maintain suitable contact between brushes and commutator, and a short flexible connector as at 56, may join each brush to its brush holder to insure proper contact therebetween.

In the armature, a longitudinal cross section of which appears in Fig. 1, a laminated core 57 carries a winding, each loop of which comprises two conductor bars 58 and 59 and a commutator segment 60 integrally extending at the closed end thereof, the conductor bars being endwise entered through the core apertures until the free ends project through and beyond the core, and the free ends being properly bent and joined in pairs to complete the circuit. Insulating material 61 is molded through and about the winding loops to insulate them one from another, to bind the segments together into a commutator and to form a protective cover which insures against the effect of oil, moisture or other injury. A cap 62 of sheet metal furnishes additional protection against physical injury and provides a seat against which the head of the screw may bear to hold the armature in position on shaft 65.

The method of making and applying an armature winding of the character shown is fully described and claimed in my Patent No. 1,631,186, and while I prefer that this type of armature be used, the conventional type having a separate commutator may be used if desired, and while I show an armature shaft which extends only through the core portion of the armature, the shaft may extend completely through the armature, if desired, and a nut on the end of the shaft, instead of the screw shown, may hold the armature in place.

To protect the brushes and commutator and still have them readily accessible I provide a cup shaped cap 66 which telescopes cover 35. Cap 66 is necessarily slotted to clear binding post 27, and the portions of the cap adjacent the binding post, made somewhat flexible because of said slot, are provided with indentures 68 which fit over corresponding indentures 69 in cover 35 to hold the cap in place. Since cap 66 is of thin metal no great amount of force is required to cause indentures 68 to slide over indentures 69 when same is being removed. A lining 70 of insulating material is provided to guard against possible contact of cap 66 and brush connectors 56. By removing cap 66 the entire set of brushes may be inspected, adjusted or renewed, and they may be inspected while the motor is running. It is obvious that by this construction access to the brush gear is much more complete than in common practice where a partially closed frame supports a shaft bearing at this end of the motor and where limited openings only are provided through which the brushes may be viewed.

The frame or mounting bracket of my motor carries the bearing within which the armature shaft may rotate, and an annular portion, adapted to support the field unit in concentric relation with said bearings, and, in order to make my motors more generally applicable, considerable variation in the form of the bracket employed is necessary, a common requirement being that the two shaft bearings be sufficiently spaced apart to supply sufficient rigidity to the armature core to enable it to maintain its concentric relation with the field unit.

When my improved dynamo electric machine is employed as a starting motor for an internal combustion engine and the engine gear is so placed as to required a considerable reach between the starting motor and the gear, a bracket such as is shown in Fig. 10 may be used. This bracket has bearings 71 and 72, a bored portion 73 to which the field member is secured, a turned portion 74 to align the motor with the engine, and a flange 75 through which bolts may extend to hold the starter in position. The bearings 71 and 72, being within the flywheel housing of the engine, receive a continuous supply of oil where the splash system is employed therein. The helical oil groove 76 may be of such pitch and direction as will carry surplus oil in bearing 71 backwardly toward the flywheel housing rather than toward the armature. The Bendix Drive shown is of standard construction and forms no part of my invention.

Figure 11:
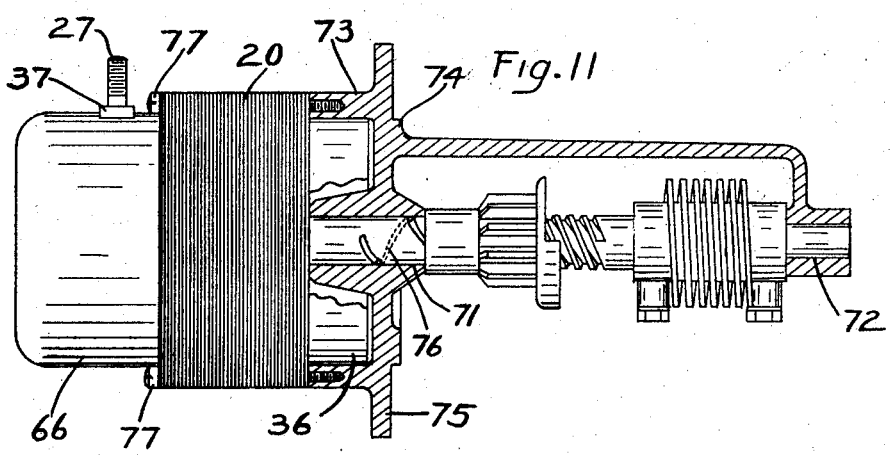

Fig. 11 shows a more approved form of mounting bracket wherein bearings 71 and 72 are more widely spaced apart and the Bendix Drive located therebetween, the greater spread of the bearings insuring more accuracy in concentric relation of the armature and field element. The Bendix Drive may be mounted as shown or it may be turned end for end if more suitable mounting conditions may be thereby secured.

Figure 12:
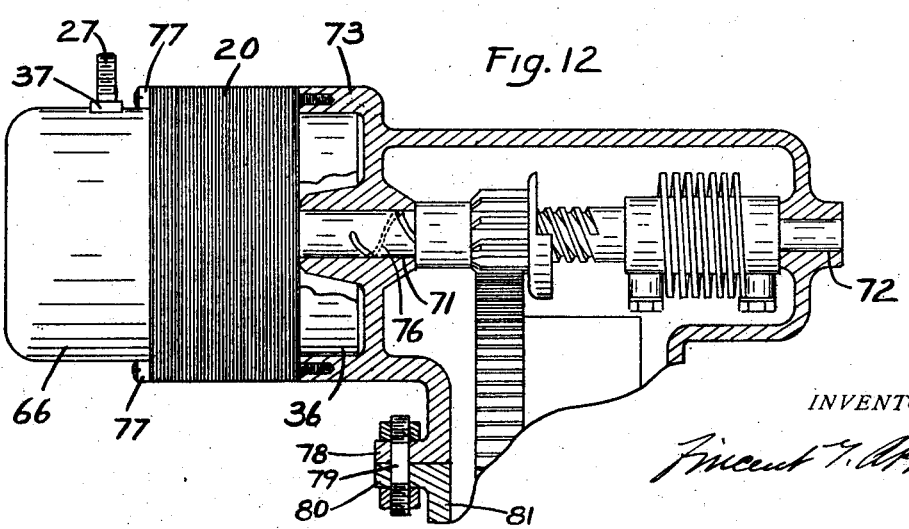

The bracket Fig. 12 dispenses with the annular flange 75 and the turned portion 74 of the other brackets shown, and has instead a flange 78 which is joined by bolts 79 to a flange 80 on the flywheel housing 81.

While the principles of my invention may find their widest application when applied to a starting motor with the Bendix Drive as shown, these principles may be equally useful when employed with other drives whether they employ a means of disconnection from the engine or are permanently connected thereto, as in a single unit starter or a charging dynamo, the more important feature of the invention consisting in the idea of selecting a compartment of the engine as a housing, providing a gear on a moving part of the engine in said housing, providing a structure which projects the pinion bearings and shaft through an opening in the wall of said housing, closes the opening, and supports the electrical elements outside the housing, to the end that all of the parts to which oil is essential are within said housing and all parts to which oil is a detriment are outside of said housing.

Having described my invention, I claim—

1. The combination, in an electric starting motor, of a bracket comprising a mounting flange, an arm having a bearing hub in its outer end extending axially from one side of said flange, a second bearing hub and an annulus concentrically surrounding said second hub at some distance therefrom, both extending from the other side of said flange a substantially equal distance, a shaft journaled in the two said hubs and having a stub end extending through the second said hub but having no other support, a starter drive on said shaft between said hubs, an armature secured to the stub end of said shaft with the core against the end of the second said hub, a field element having the core secured to the end of said annulus, one winding head of said field element and the back winding head of said armature extending into the space surrounding the said second hub between said second hub and said annulus.

2. The combination, in an electric starting motor of a field core, a bar winding on said core, an annulus at each end of the core comprising the winding heads of the bar winding, thin metal shells surrounding the winding heads relatively closely but not touching them and rings of molded insulation filling the space between the bars of the winding heads and the thin metal shells, a bearing head carrying two spaced apart bearing hubs secured to one end of the core around one said annulus, a brush cap secured to the other end of said core surrounding the other said annulus, a brush rigging secured to the end of the annulus within said brush cap, and an armature within said field having rotative bearing in the two said bearing hubs but no other support.

In testimony whereof, I hereunto set my hand.

VINCENT G. APPLE.